United States Patent
Kobayashi

[11] Patent Number: 5,820,890
[45] Date of Patent: *Oct. 13, 1998

[54] APPARATUS FOR CUTTING PLASTIC BAR-SHAPED FOOD

[75] Inventor: Masao Kobayashi, Fukui, Japan

[73] Assignee: Kobird Co., Ltd., Fukui, Japan

[ * ] Notice: The term of this patent shall not extend beyond the expiration date of Pat. No. 5,558,896.

[21] Appl. No.: 418,419

[22] Filed: Apr. 7, 1995

Related U.S. Application Data

[63] Continuation-in-part of Ser. No. 202,636, Feb. 28, 1994, abandoned, which is a continuation-in-part of Ser. No. 288, Jan. 4, 1993, abandoned.

[30] Foreign Application Priority Data

Jan. 30, 1992 [JP] Japan .................................. 4-42183

[51] Int. Cl.⁶ ................................ A21C 5/00; A23P 1/00; B29C 47/06
[52] U.S. Cl. ...................... 425/133.1; 425/295; 425/308
[58] Field of Search .................................. 425/295, 287, 425/288, 308, 133.1; 426/503

[56] References Cited

U.S. PATENT DOCUMENTS

| | | | |
|---|---|---|---|
| 4,734,024 | 3/1988 | Tashiro | 425/308 |
| 4,767,304 | 8/1988 | Tashiro | 425/308 |
| 4,767,305 | 8/1988 | Tashiro | 425/308 |
| 4,854,842 | 8/1989 | Kobayashi | 425/308 |
| 4,966,542 | 10/1990 | Kobayashi | 425/308 |
| 5,031,520 | 7/1991 | Tsay | 425/307 |
| 5,153,010 | 10/1992 | Tashiro | 425/287 |
| 5,190,770 | 3/1993 | Tashiro | 425/132 |
| 5,223,277 | 6/1993 | Watanabe et al. | 425/308 |
| 5,558,896 | 9/1996 | Kobayashi | 425/308 X |

FOREIGN PATENT DOCUMENTS 62-278935 12/1987 Japan .................................. 425/308

*Primary Examiner*—Leo B. Tentoni
*Attorney, Agent, or Firm*—Staas & Halsey

[57] ABSTRACT

An apparatus for cutting a plastic bar-shaped food which is continuously extruded from an extruding mechanism into a bar shape having a core material, the food material efficiently cut off into a globular shape without exposing the core food material to the outside and leaving any burr on the cut end portion. The bar-shaped food material has a core material which is formed into a globular food product with an inner core food material covered with an outer skin food material. A cutting mechanism is provided below a nozzle of the extruding mechanism, the cutting mechanism having at least three shutters in which an arc cutter side having chamfer portions on its upper and lower surfaces is formed on the side portion of each shutter. A cutting tip for cutting the bar-shaped food material is formed on the free end portion of each shutter while each shutter is pivotally mounted so that each cutting tip side faces one another. By swinging reciprocally and synchronously each shutter of the cutting mechanism, an expanding and constricting gate is generated in the center portion. By extruding and supplying, the bar-shaped food material is constricted and all the constricted surfaces of the constricted and squeezed food material is smoothed and rubbed, thereby cutting the food material into the globular shape.

8 Claims, 11 Drawing Sheets

(1)

(1)

ined size is rolled and rubbed in a cylinder chamber generated in the
APPARATUS FOR CUTTING PLASTIC BAR-SHAPED FOOD This application is a continuation-in-part of Ser. No. 08/202,636 filed Feb. 28, 1994, now abandoned, which is a continuation-in-part of Ser. No. 08/000,288 filed Jan. 4, 1993 now abandoned.

BACKGROUND OF THE INVENTION

The present invention relates to improvements in an apparatus for cutting a plastic bar-shaped food material, continuously extruded from an extruding mechanism, into a globular shape, and the apparatus is particularly useful to form the bar-shaped food material having core material into a kind of globular food product, with an inner core food material covered with an outer skin food material and thus the value of commodity in the food product can be more improved.

Globular or semi-globular food products such as dumplings, bean-jam buns, rice cakes stuffed with sweetened bean jam, and bread with bean jam or cream wrapped inside are very difficult to form mechanically. For example, even if the above globular food products are formed using "APPARATUS FOR SHAPING A SPHERICAL BODY" proposed in the specification of U.S. Pat. No. 4,767,304, the finished food products have been still insufficient and there has been ample room for improvements in aspects of performance, efficiency and accuracy of a machine judging by the present inventor.

Under such circumstances, the present inventor has attempted to mechanize and automate food production for a long time, and particularly for the mechanization of the above globular or semi-globular foods, the present inventor has made many trial experiments to implement the improvements in productivity and food hygiene and has succeeded in practical use. Also, various patents on these results have been acquired.

Now, many examples wherein the present inventor has put the mechanical skills for cutting a plastic bar-shaped food material into a globular shape to practical use will be divided into various types for description. One type of these types is as follows. A plastic bar-shaped food material, extruded from an extruding mechanism as a bar shape, is introduced into the opposed portion of a pair of caterpillar cylinders or caterpillar belts, whose edge portions horizontally reciprocate in slight contact with each other and whose slight contact sides descend from the upper portion to the lower portion at a regular speed and which perform a circulating movement, and the food material cut at a predetermind size is rolled and rubbed in a cylinder chamber generated in the opposed portion and thereby the food material is cut into a globular shape (see U.S. Pat. No. 4,398,881, Japanese Patent Publication No. 58-1888, Japanese Patent Publication No. 61-10096 and so on).

Though the above cutting apparatus of caterpillar belt type has had the advantage to the case of continuously mass-producing globular foods with the same size, for a flexible manufacturing of small lot size, another caterpillar belt (with a necessary size) needs to be replaced in order to change a molding chamber of cylinder type formed by the caterpillar belt uniformly. Its replacement has been very troublesome and the caterpillar belt has required high accuracy, so that a cost burden has been remarkably increased.

In view of such situations, next, the present inventor has put an apparatus using molding means with a built-in composite cavity to practical use (see U.S. Pat. Nos. 4,854,842 and 5,004,619). By this apparatus, many kinds of plastic food materials are molded into a multi-layer cylinder shape with the bottom and a solid state food (or another kind of plastic food material) is introduced into the molded cylinder bottom and a bottom gate of the molding means is opened and closed and thereby the plastic food materials can be pushed out into a globular shape with their cut end wrapped.

Though the above apparatus using the molding means has allowed solid state wrapped foods such as maroon bun (inside maroon, outside dough), rice cake stuffed with strawberry and sweetened bean jam (inside strawberry, outside rice cake) and the like to be manufactured with high accuracy, the wrapped foods with various sizes have been hard to manufacture and also the apparatus has been expensive.

Under such circumstances, the present inventor has completed "an apparatus for formation of a shaped food product" described in the specifications of U.S. Pat. No. 4,966,542 and Japanese Patent Publication No. 5-22503 as a low-cost apparatus capable of cutting a plastic bar-shaped food material into a globular shape with an inside food material sealed surely. In this apparatus, four helix cutters whose radius increases gradually along an involute line from a chipped blade portion are symmetrically pivoted on a virtual circumference at an equal angle, and self rotation and orbital revolution of these helix cutters are performed at the same time, and the plastic bar-shaped food material is extruded and supplied from an extruding mechanism into the center portion of the virtual circle and the food material is cut into the globular shape.

Though the structure of the above cutting apparatus of helix cutter type can be simplified, since a mechanism of self rotation and orbital revolution of the four helix cutters has been adopted after all, the movement range of the helix cutters has been inevitably increased to provide the large-sized apparatus. Further, the environment in a factory has become worse due to noise caused by self rotation and orbital revolution of the helix cutters and also the working power has been inevitably increased.

So, the present inventor has advanced a further development and has attempted to manufacture a cutting apparatus for bar shaped plastic food in which shutters with a substantially pointed knife shape as shown in FIGS. 1 and 8 of U.S. patent application Ser. No. 08/000,288 filed Jan. 4, 1993, now abandoned, corresponding to the original application of the present application are symmetrically pivoted on a virtual circumference at an equal angle to swing reciprocably.

However, even for the above cutting apparatus, a burr having a continuously thin string shape generated by pressing a bar-shaped food material with the tip ends of the above shutters inevitably has occurred in the gathering portion of the tip ends of the shutters, that is, in the center portion of FIG. 7 of U.S. patent application Ser. No. 08/000,288, filed Jan. 4, 1993, now abandoned so that the demands such as severe uniformity of food shape in the recent food manufacturing industry cannot have been met.

In view of the foregoing inconveniences, an object of the present invention is to provide an apparatus for cutting a plastic bar-shaped food material comprising a cutting mechanism in which even for a plastic food material continuously extruded and supplied into a bar shape, the food material can be efficiently cut off into a globular shape without exposing a core food material such as bean jam or cream to the outside and leaving any unsightly burr on the outside with the core food material wrapped in an outer skin food material and also the structure is simple and the manufacturing cost can be reduced.

SUMMARY OF THE INVENTION

Means adopted by the present inventor to solve the above technical problems is described with reference to the accompanying drawings as follows.

Namely, the most characteristic of the present invention is in adopting such a cutting means as an apparatus for cutting a plastic bar-shaped food comprising a cutting mechanism (M) provided below a nozzle (N) of an extruding mechanism (3) for continuously extruding a plastic food material as a bar-shaped food material (F), said cutting mechanism (M) comprising (a) at least three shutters (1, 1, . . . ), the edge sides of the free ends of the shutters (1, 1, . . . ) swinging reciprocably and synchronously in the area within a virtual circumference (C) with points (P, P, . . . ) located on the equally divided virtual circumference (C) drawn with a radius (R) around a center (0) as supporting points, (b) the edge of the free end of each shutter (1) being provided with a cutting tip side (11) for cutting off the plastic bar-shaped food material (F) in sliding contact with the adjacent shutter (1), an arc cutter side (12) for generating an expanding and constricting gate (G) opened and closed around the center (0) of the virtual circumference (C) on one side fringe portion regarding the cutting tip side (11), and a blocking side (13) for fitting with the adjacent cutter side (12) on the other side fringe portion regarding the cutting tip side (11), (c) the upper and lower surfaces of the arc cutter side (12) being provided with chamfer portions (12a, 12a), the chamfer portions (12a, 12a) being formed in such a manner that the inclination with regard to the horizontal plane becomes smaller as their chamfered position gets nearer to the cutting tip side (11), (d) the side surface of the blocking side (13) being provided with a notch portion (13a) capable of accepting the chamfer portion (12a) of the adjacent cutter side (12), the notch portion (13a) being formed by hollowing out the side surface of the blocking side (13) from the cutting tip side (11) toward the side of the supporting point (P), wherein the plastic bar-shaped food material (F) extruded from the nozzle (N) of the extruding mechanism (3) is introduced toward the expanding and constricting gate (G) generated by each arc cutter side (12) of the shutters (1, 1, . . . ) in the cutting mechanism (M) in accordance with their swing movement, and while each arc cutter side (12) constricts the portion around the food material (F), the food material (F) is cut into a globular food (f) bringing the constricted surface of the food material (F) constricted and squeezed by each arc cutter side (12) into contact with the chamfer portions (12a, 12a, . . . ) formed on the upper and lower surfaces of each arc cutter side (12).

BRIEF DESCRIPTION OF THE DRAWINGS

FIGS. 4 to 8 are illustrations sequentially showing a cutting process of the plastic bar-shaped food material in the embodiment in which the shutter is mounted and these illustrations are described in further detail as follows;

DETAILED DESCRIPTION OF THE PREFERRED EMBODIMENTS

Figure 2:
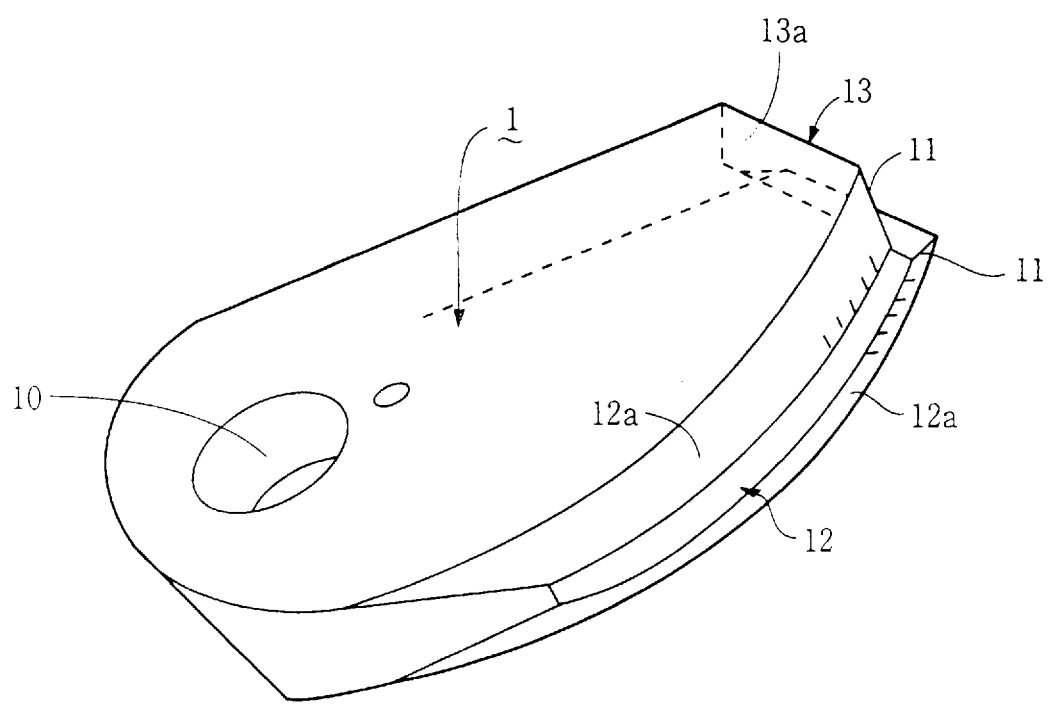
FIG. 2 is a perspective view of one type of shutter used in a cutting mechanism in the embodiment of FIG. 1.
Figure 9:
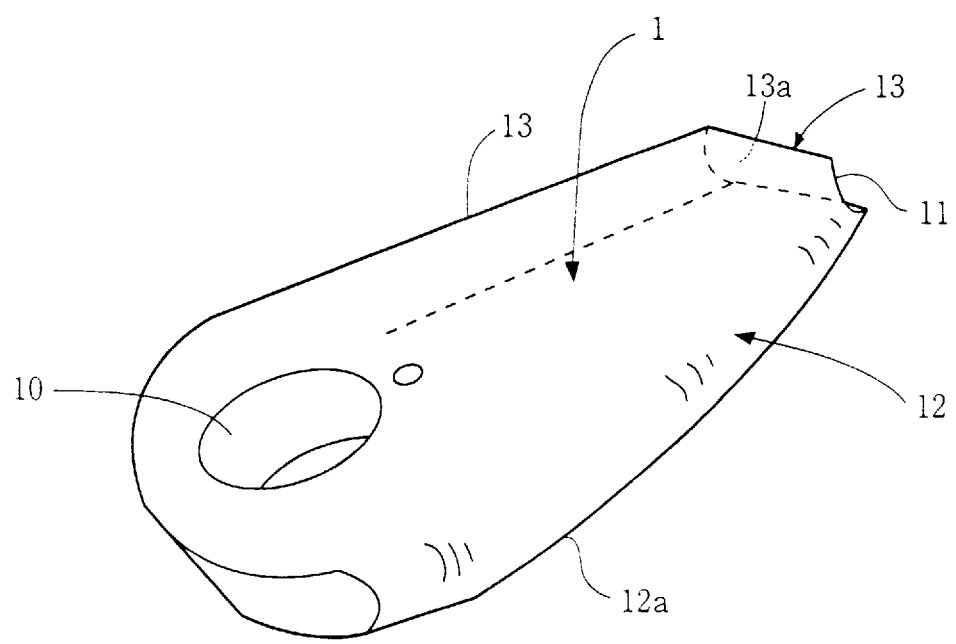
FIG. 9 is a perspective view of another type of shutter used in the cutting mechanism mounted on the apparatus of FIG. 1.
Figure 10:
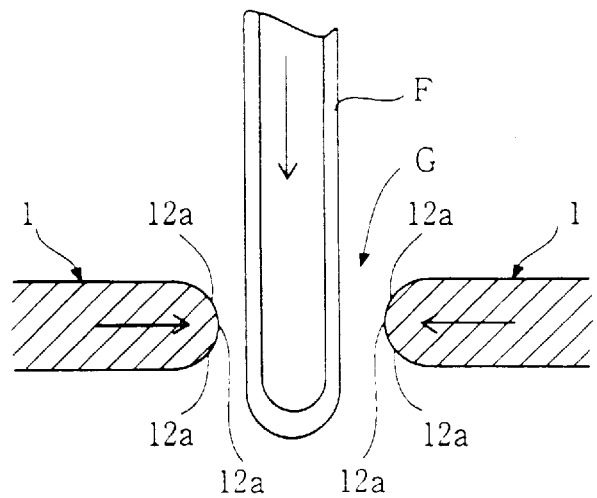
FIG. 10 is an elevational sectional illustration of the state in which the plastic bar-shaped food material is extruded and supplied into the center of the gate in the expanded state.
Figure 11:
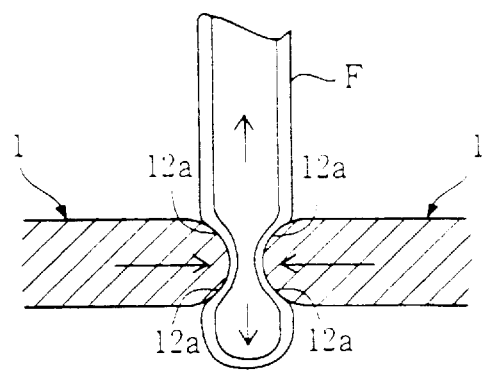
FIG. 11 is an elevational sectional illustration of the state in which the cutter sides for generating the gate are constricted while the narrowing gate presses the bar-shaped food material.
Figure 12:
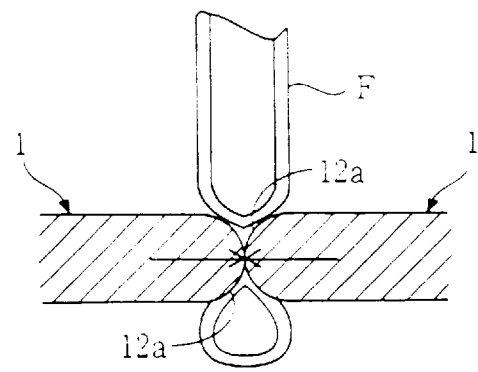
FIG. 12 is an elevational sectional illustration of the shutter and the bar-shaped food material of the state sandwiched by the gate in the closed state.
Figure 13:
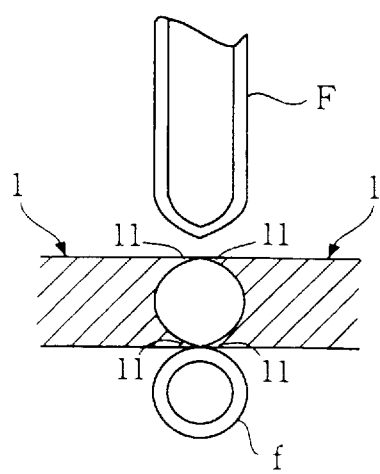
FIG. 13 is an elevational sectional illustration of the state in which the cutting tip sides of the shutters cut off the lower portion of the bar-shaped food material to separate it as a globular food.

Four shutters (1, 1, 1, 1) mounted in a cutting mechanism (M) of the present embodiment are formed into a flat shape like a substantially pointed knife as shown in FIGS. 2 and 9. The shutter (1) has a pivot portion (10) to be pivotally mounted on a supporting point (P) (described later) in the center of a base end portion of the shutter (1). The free end portion opposite to this pivot portion (10) is provided with a cutting tip side (11), an arc cutter side (12) projectingly curved at a predetermined curvature on one side fringe portion regarding this cutting tip side (11), and a blocking side (13) for fitting with the arc cutter side (12) on the other side fringe portion regarding the cutting tip side (11). Further, chamfer portions (12a, 12a) are formed on the upper and lower surfaces of the arc cutter side (12), and the side surface of the blocking side (13) is hollowed out and a notch portion (13a) is formed on the side surface.

In the shutter (1) shown in FIG. 2, the chamfer portions (12a, 12a) with a taper shape are formed on the upper and lower surfaces of the arc cutter side (12) in such a manner that the inclination with regard to the horizontal plane becomes smaller as their chamfered position gets nearer to the cutting tip side (11).

Also, in the shutter (1) shown in FIG. 9, the chamfer portions (12a, 12a) with a plus cylinder curved surface are formed on the upper and lower surfaces of the arc cutter side (12) in such a manner that the angle of tangent with regard to the horizontal plane, that is, the inclination of curved surface becomes smaller as their chamfered position gets nearer to the cutting tip side (11).

The blocking side (13) including the notch portion (13a) of its side surface in the shutter (1) shown in FIG. 2 is hollowed out and formed into a tapered recess surface so as to fit with the shape of the chamfer portions (12a, 12a) formed on the arc cutter side (12) and thus the chamfer portions (12a, 12a) of the arc cutter side (12) are covered with the notch portion (13a). Similarly, the blocking side (13) in the shutter (1) shown in FIG. 9 is a curved surface formed into a cylindrical recess so as to fit with the shape of the chamfer portions (12a, 12a).

Figure 3:
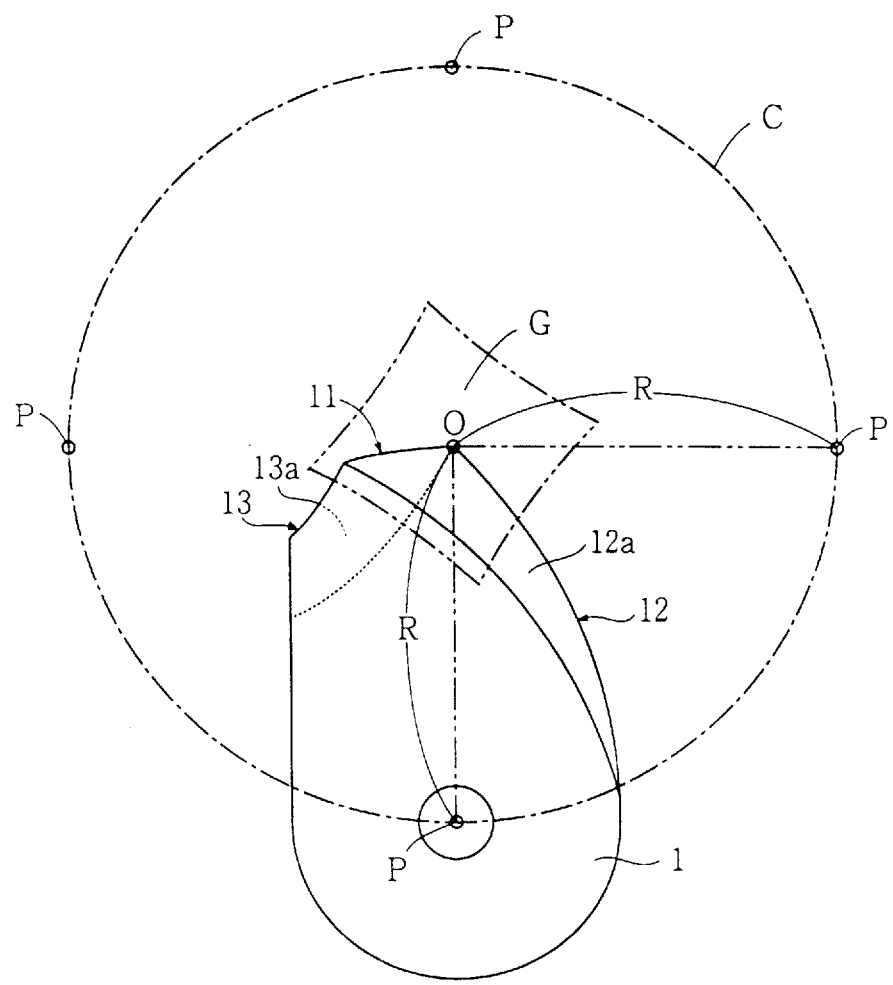
FIG. 3 is an illustration showing a plane arrangement relation of the shutter of FIG. 2.

In the case of providing the cutting mechanism (M) of the present embodiment using the four shutters (1, 1, 1, 1) shown in FIG. 2, the pivot portions (10, 10, 10, 10) of the four shutters (1, 1, 1, 1) are pivotally mounted so as to swing reciprocably and synchronously with four points (P, P, P, P) located on an equally four-divided virtual circumference (C) drawn with a radius (R) around a center (0) as supporting points as illustrated in FIG. 3. In this case, the synchronous swing of the shutters (1, 1, 1, 1) is implemented by the well-known mechanism described later. The shutters (1, 1, 1, 1) constructed thus generate an expanding and constricting gate (G) in which the arc cutter sides (12) of each shutter (1) are inevitably opened and closed around the center (0) by performing the reciprocable swing synchronously at the same time as illustrated in FIG. 3. By the way, when the four shutters (1) are used as indicated in the present embodiment, an area of the expanding and constricting gate (G) can be increased and thereby a bar-shaped food material having a greater diameter can be cut.

Figure 1:
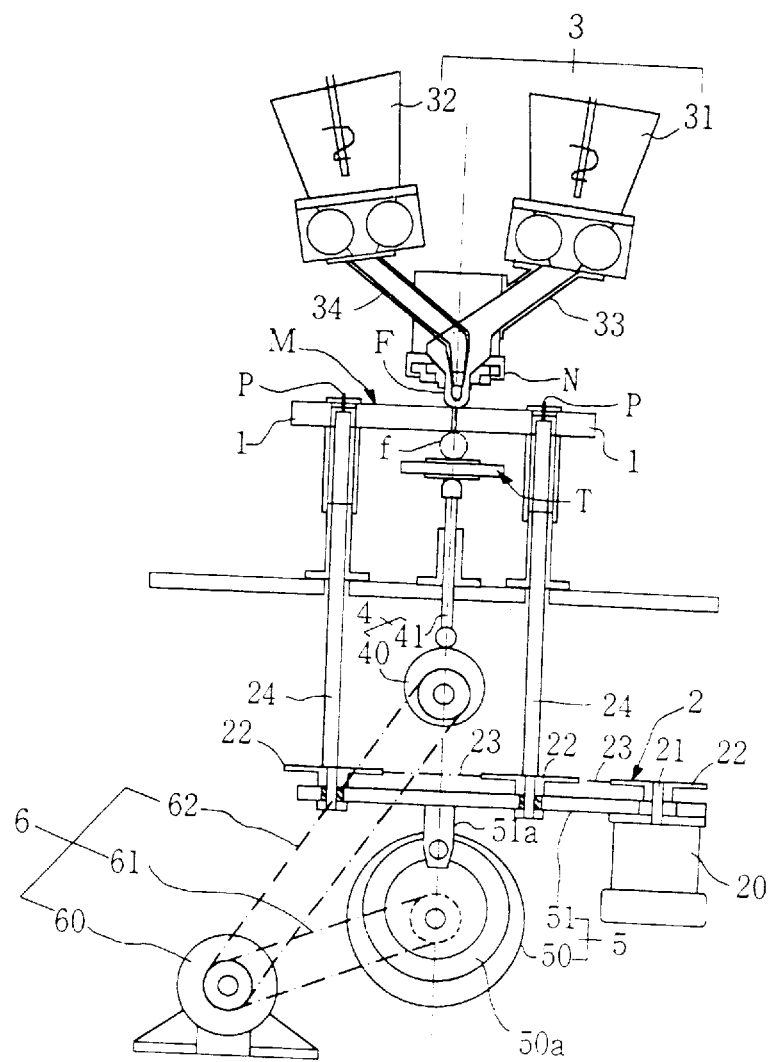
FIG. 1 is a diagrammatic elevational view of an embodiment of an apparatus for cutting a plastic bar-shaped food according to the present invention.

An apparatus for cutting a plastic bar-shaped food shown in FIG. 1 includes the above cutting mechanism (M) as one component. Namely, the cutting mechanism (M) is vertically movably arranged below a nozzle (N) of an extruding mechanism (3) so that the center of the gate (G) generated by the shutters (1, 1, 1, 1) coincides with that of the nozzle (N) and further a vertically movable table (T) is arranged below the cutting mechanism (M). The extruding mechanism (3) arranged on the uppermost portion in FIG. 1 comprises an extruder (31) for extruding a plastic outer skin food material and an extruder (32) for extruding a plastic inner core food material, and these food materials are joined and extruded through an outer pipe (33) and an inner pipe (34) as the bar-shaped food material with core material. Also, the vertically movable table (T) is a mechanism portion for receiving a food (f) cut off into a globular shape by the cutting mechanism (M) as described later while the table (T) is raised so as not to be subject to any shock and for conveying the globular food (f) downward.

First, in the shutters (1, 1, 1, 1) of the cutting mechanism (M) as described above, an opening and closing cut operation of the gate (G) is provided by an associate shutter driving mechanism (2) comprising a reciprocating rotary motor (20), a sprocket and chain transmission portion including sprockets (22) and chains (23) reciprocably driven by connecting them to a driving shaft (21) of the rotary motor (20), and pivot shafts (24) connected to each pivot portion (10) of the four shutters (1, 1, 1, 1) and by which each shutter (1) is simultaneously pivoted in accordance with the reciprocating movement of the sprockets (22). Also, the entire associated driving mechanism (2) is placed on a vertically movable mechanism (5) described later and a vertical movement to the driving associated mechanism (2) is provided at a required speed.

Next, the vertically movable table (T) is designed to receive the globular food (f) cut and separated by the cutting mechanism (M) as described above without any shock due to dropping down. Immediately after cutting of the globular food (f), the table (T) is raised close to the bottom of the food (f), and receives the food (f) and thereafter is lowered. In the apparatus for forming the globular food (f) shown in FIG. 1, a vertical movement mechanism (4) of this table (T) comprises a table vertically movable cam (40) for generating a vertical movement in accordance with the cutting timing of the globular food (f) and a driven rod (41) for supporting the table (T) on the top end of the rod (41) and vertically moving the table (T) while the driven rod (41) can be vertically moved in sliding contact with the cam surface of the vertically movable cam (40).

Further, a vertically movable mechanism (5), for performing the vertical movement on which the cutting mechanism (M) and the shutter driving associated mechanism (2) mentioned above are placed, comprises a frame vertically movable grooved cam (50), and a vertically movable frame (51) for performing the vertical movement at a required timing in accordance with the position of a guide groove (50a) of this grooved cam (50) with the cutting mechanism (M) and the shutter driving associated mechanism (2) placed on, the frame (51) having a supporting rod (51a) idly fitted in the guide groove (50a).

In FIG. 1, numeral (6) indicates a cam driving mechanism for rotationally driving the table vertically movable cam (40) and the frame vertically movable grooved cam (50). The cam driving mechanism (6) comprises a cam rotary motor (60), a chain (61) for transmitting the revolution of this motor (60) to the frame vertically movable grooved cam (50), and a chain (62) for transmitting the revolution of the motor (60) to the table vertically movable cam (40).

Thus, in the apparatus for cutting the bar-shaped food shown in FIG. 1, a plastic bar-shaped food material (F) having core material extruded from the extruding mechanism (3) is introduced into the expanding and constricting gate (G) of the cutting mechanism (M) which is in an open state at a raised position, and after the food material (F) is further introduced by a predetermined length, the cutting mechanism (M) starts to be lowered at the substantially same speed as the extruding speed of the food material (F). Then, in the process of lowering the cutting mechanism (M), the gate (G) is gradually reduced and when the cutting mechanism (M) reaches the lowermost position, the gate (G) is completely shut and thereby a food (f) is cut off into a globular shape from the lower end of the bar-shaped food material (F). The cut-off globular food (f) is received on the vertically movable table (T) located at a raised position without any shock and is placed on a well-known belt conveyer (not shown) and is fed to a predetermined destination.

Now, the process of cutting the plastic bar-shaped food material (F) by the cutting mechanism (M) will be sequentially described with reference to FIGS. 4(a)–8(b).

Figure 4A:
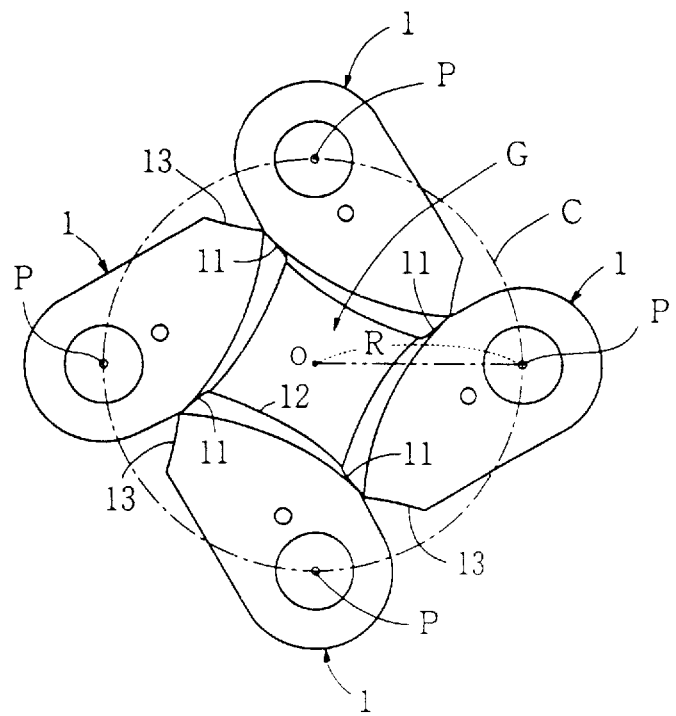
FIG. 4(a) is a plan illustration of the state in which an expanding and constricting gate generated by the shutters is expanded.
Figure 4B:
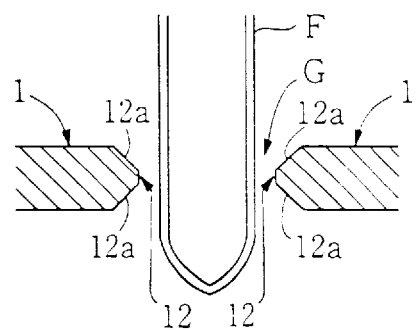
FIG. 4(b) is an elevational sectional illustration of the state in which the plastic bar-shaped food material is extruded and supplied into the center of the gate in the same state as FIG. 4(a)

Firstly, as shown in FIGS. 4(a) and 4(b), when the expanding and constricting gate (G) is in the opened state by swinging the cutting tip sides (11, 11, 11, 11) of the shutters (1, 1, 1, 1) in the direction of the virtual circumference (C), the bar-shaped food material (F) is extruded from the extruding mechanism (3) shown in FIG. (1) and the lower end portion of the food material (F) is introduced into the gate (G) in the opened state by a predetermined length.

Figure 5A:
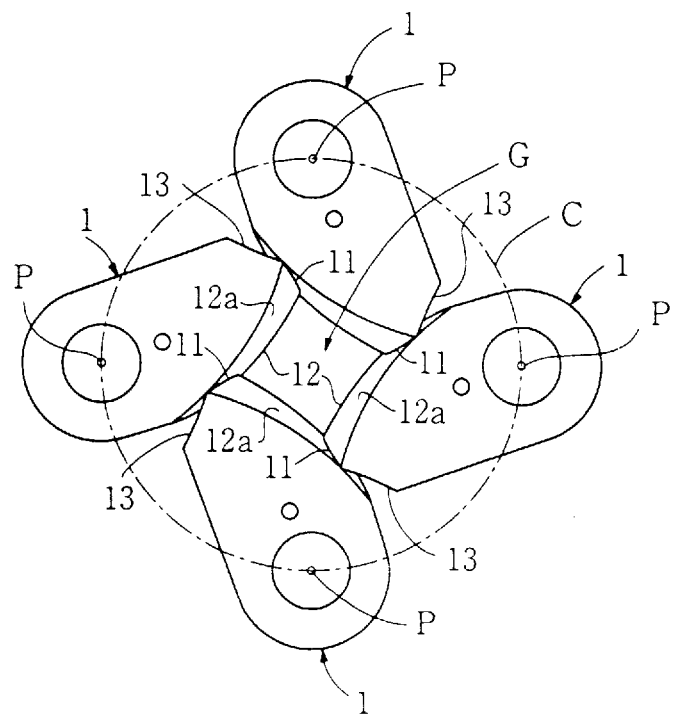
FIG. 5(a) is a plan illustration of the state in which the gate of the shutters is narrowing.
Figure 5B:
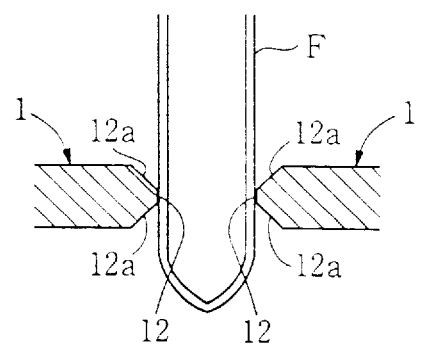
FIG. 5(b) is an elevational sectional illustration of the state in which cutter sides for generating the gate are constricted while the narrowing gate presses the bar-shaped food material.

Then, as shown in FIG. 5(a), the cutting tip sides (11, 11, 11, 11) start to be swung in the center direction of the circumference (C) in sliding contact with each arc cutter side (12). As shown in FIG. 5(b), the arc cutter sides (12, 12, 12, 12) gradually constrict the portion around the food material (F) from all directions. At this time, the chamfer portions (12a, 12a, 12a, 12a) come into contact with the upper and lower portions of the constricted food material (F) thoroughly. The contact between the chamfer portions (12a, 12a, 12a, 12a) and the constricted portion of the food material (F) has a preferable effect on forming the cut portion into a good shape and the effect is caused by the chamfer portion (12a) formed on each arc cutter side (12).

Figure 6A:
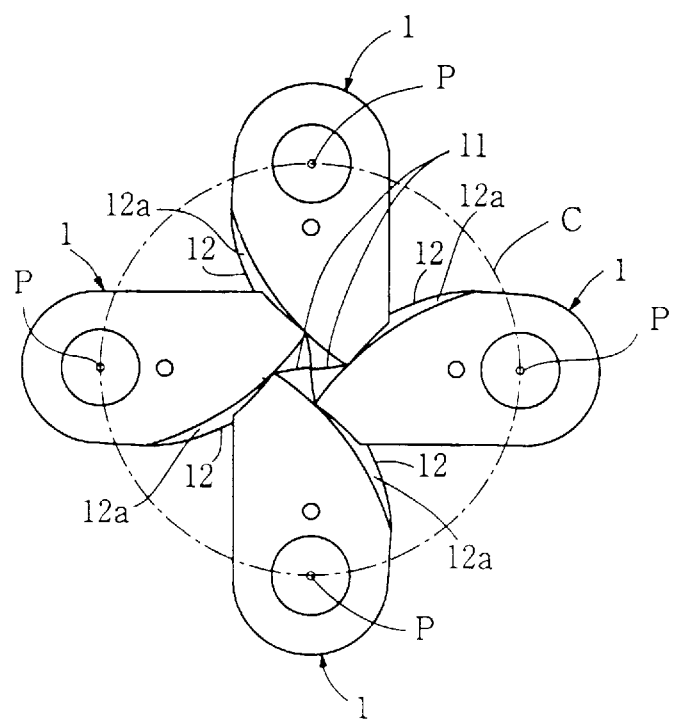
FIG. 6(a) is a plan illustration of the state in which the projecting end portions of the cutter sides of each shutter are to one another to close the gate.
Figure 6B:
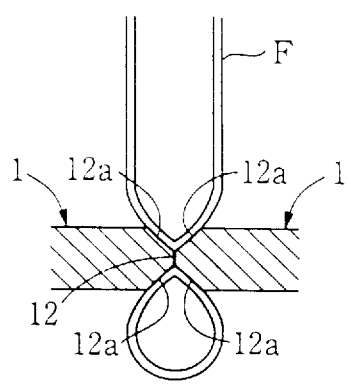
FIG. 6(b) is an elevational sectional illustration of the shutter and the bar-shaped food material of the state sandwiched by the gate in the same state as FIG. 6(a)

Subsequently, as shown in FIG. 6(a), when the projecting end portions of the arc cutter sides (12, 12, 12, 12) are gathered next to one another to close the gate (G), as shown in FIG. 6(b), the food material (F) is pushed and squeezed by the cutter sides (12, 12, 12, 12) and thereby is made to thrust in the vertical direction while the inclination of a smoothing and rubbing operation through the chamfer portions (12a, 12a, 12a, 12a) becomes smaller and the smoothing and rubbing operation reaches the proximity of the root of the constricted surface of the food material (F).

Figure 7A:
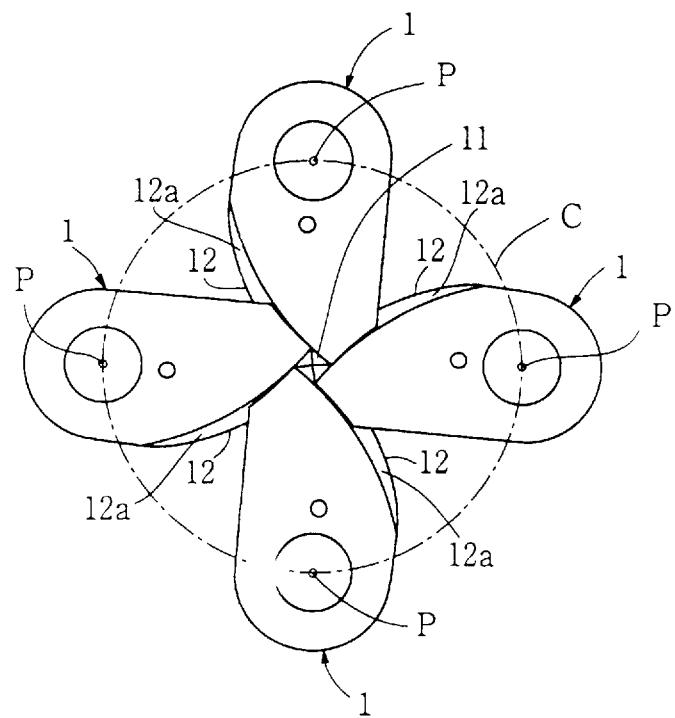
FIG. 7(a) is a plan illustration of the process in which cutting tip sides of the shutters perform a cut-off operation.
Figure 7B:
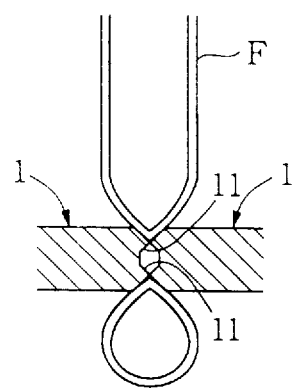
FIG. 7(b) is an elevational sectional illustration of the state in which the cutting tip sides of the shutters in the same state as FIG. 7(a) are cutting off the lower portion of the bar-shaped food material.

As shown in FIG. 7(a), when the shutters (1, 1, 1, 1) are further swung, the cutting tip sides (11, 11, 11, 11) formed on the free end portions of these shutters (1, 1, 1, 1) start a cut-off operation while the tip sides (11, 11, 11, 11) are slidably gathered in the facing state next to one another and as shown in FIG. 7(b), the food material (F) starts to be cut and separated in the vertical direction.

Figure 8A:
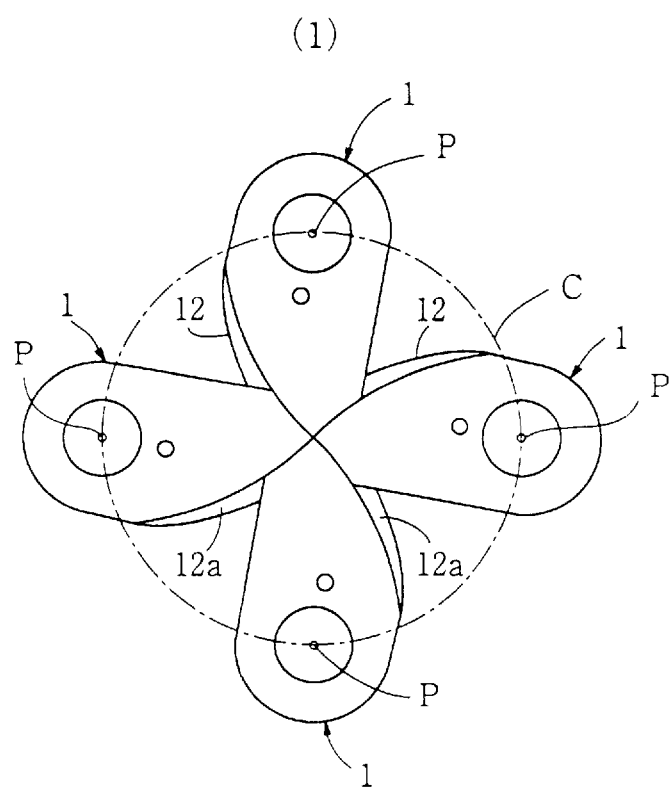
FIG. 8(a) is a plan illustration of the state in which the projecting end portions of the cutting tip sides are gathered next to one another to complete the cut-off operation.
Figure 8B:
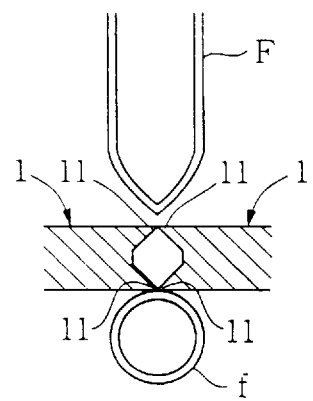
FIG. 8(b) is an elevational sectional illustration of the cut-off completion state in which the projecting end portions of the cutting tip sides are gathered next to one another to cut off the lower portion of the bar-shaped food material into a globular shape.

Lastly, as shown in FIG. 8(a), when the swing movement of the shutters (1, 1, 1, 1) reaches the end position and the projecting end portions of the cutting tip sides (11, 11, 11, 11) of these shutters (1, 1, 1, 1) become the facing state at the top and bottom surfaces of each shutter (1), the cut-off operation by each cutting tip side (11) is completed and as shown in FIG. 8(b), the cutting tip sides (11, 11, 11, 11) cut off the constricted portion of the plastic bar-shaped food material (F) at the root without leaving any burr. Thus the cut-off food material (F) is dropped below the shutters (1, 1, 1, 1) as the globular food (f).

Furthermore, FIGS. 10 to 13 are elevational sectional illustrations sequentially showing a cutting process of the plastic bar-shaped food material (F) by means of the cutting mechanism (M) using the shutter (1) with the chamfer portions (12a, 12a) having the plus cylinder curved surface formed on the upper and lower surfaces of the arc cutter side (12) shown in FIG. 9. In this case, the opening and closing state of the expanding and constricting gate (G) by the shutter (1) and the cutting operation of the food material (F) are essentially identical to the case of FIGS. 4 to 8 mentioned above, so a detailed description is omitted to avoid repetition.

Although the examples embodied in the present invention have been generally described as mentioned above, it should be understood that the present invention is not limited to the above embodiments but can be modified in various ways within the scope of the accompanying patent claims. For instance, the chamfer portions formed on the upper and lower surfaces of the arc cutter side of the shutter indicated in the above examples have a symmetrical shape with respect to each other but may have an asymmetrical shape, and its shape may be appropriately modified in accordance with physical properties of the plastic bar-shaped food material to be cut.

As having been described above, the present invention adopts the construction in which at least three shutters, preferably four shutters, are provided in such a manner of swinging reciprocably and synchronously with positions located on an equally divided virtual circumference as supporting points. Further, the edge of the free end of each shutter is provided with a cutting tip side, an arc cutter side for generating an expanding and constricting gate opening and closing around the center of the virtual circumference on one side fringe portion regarding the cutting tip side, and a blocking side having a notch shape for fitting with the adjacent cutter side on the other side fringe portion regarding the cutting tip side. Further still, the upper and lower surfaces of the arc cutter side are provided with chamfer portions formed in such a manner that the inclination with regard to the horizontal plane becomes smaller as their chamfered position gets nearer to the cutting tip side.

Because of this construction, in "cutting mechanism of plastic bar-shaped food material" constructed through the application of the present invention, even for a plastic food material extruded and supplied into a bar shape with a core material, the constricted portion of the food material is formed into a round shape by the chamfer portions while the portion around the food material is gradually smoothly constricted by means of the gate generated by the arc cutter sides of each shutter. The food material is cut off by the cutting tip side formed on the free end portion (as if a pair of scissors is used to cut the food material) and then the lower end portion of the food material can be separated into a globular shape. Thereby a globular food product having an excellent value of commodity can be manufactured without exposing the core material to the outside and without leaving any unsightly burr.

Also, the cutting mechanism of the present invention has a simple structure in which each shutter is swung reciprocably and simultaneously toward the center of the virtual circumference, so that a manufacturing cost can be reduced as well as the bar-shaped food material can be efficiently cut into the globular shape.

Thus, according to the present invention, the difficult problems encountered in a conventional apparatus for cutting the bar-shaped food material can be solved without any discontent, and the utilization in industry is extremely high.

What is claimed is:

1. An apparatus for cutting plastic bar-shaped food comprising:

an extruding mechanism having a nozzle to continuously extrude plastic bar-shaped food;

a supporting device;

a cutting mechanism having at least three shutters axially supported by the supporting device and equally divided around a virtual circumference, wherein the virtual circumference is centered below the nozzle of said extruding mechanism, said shutters being arranged to synchronously reciprocate and rotate with respective free end edge portions passing the center of said virtual circumference to generate a constrictive gate enlarging and reducing around the center of said virtual circumference, each of said shutters further comprising:

- a cutting tip side arranged at the free end edge portion of the shutter to shear off the plastic bar-shaped food in sliding contact with a first adjacent shutter;
- an arc cutter side arranged at a first fringe side of the shutter and meeting said cutting tip side;
- a blocking side arranged at a second fringe side of the shutter and meeting said cutting tip side, said blocking side in sliding contact with an arc cutter side of a second adjacent shutter;
- chamfered portions respectively formed at upper and lower surfaces of said arc cutter side; and
- a notch portion meeting said blocking side and stepped towards the supporting device from said cutting tip side so as to receive a chamfered portion of the second adjacent shutter.

2. The apparatus as set forth in claim 1, wherein each chamfered portion is formed into a taper shape.

3. The apparatus as set forth in claim 1, wherein each chamfered portion is formed into a curved surface.

4. The apparatus as set forth in claim 1, wherein the extruding mechanism further comprises:

- an outer skin extruder for extruding a plastic outer skin of the plastic bar-shaped food; and
- an inner core extruder for extruding a plastic inner core of the plastic bar-shaped food.

5. An apparatus for cutting plastic bar-shaped food comprising:

- an extruding mechanism having a nozzle to continuously extrude plastic bar-shaped food;
- a supporting device; and
- a cutting mechanism having at least three shutters axially supported by the supporting device and equally divided around a virtual circumference, wherein the virtual circumference is centered below the nozzle of said extruding mechanism, said shutters being arranged to synchronously reciprocate and rotate with respective free end edge portions passing the center of said virtual circumference to generate a chamfered constrictive gate enlarging and reducing around the center of said virtual circumference.

6. An apparatus for cutting bar-shaped food comprising:

an extruding mechanism to continuously extrude plastic bar-shaped food;

a supporting device; and a cutting mechanism having a plurality of shutters axially supported to synchronously reciprocate and rotate by the supporting device through equal division around a virtual circumference, wherein the virtual circumference is centered below said extruding mechanism, said shutters being arranged to move with respective free end edge portions passing the center of said virtual circumference to generate a chamfered constrictive gate enlarging and reducing around the center of said virtual circumference.

7. An apparatus for cutting bar-shaped food comprising:

an extruding mechanism to continuously extrude plastic bar-shaped food;

a supporting device; and a cutting mechanism having a plurality of shutters supported by the supporting device to synchronously reciprocate and rotate and equally divided around a virtual circumference, wherein the virtual circumference is centered below said extruding mechanism, said shutters being arranged to pass the center of said virtual circumference to generate a chamfered constrictive gate of variable dimension about the center of said virtual circumference.

8. An apparatus for cutting bar-shaped food comprising:

a mechanism to extrude bar-shaped food;

a supporting device; and a cutting mechanism having a plurality of shutters supported by the supporting device to synchronously reciprocate and rotate through equal division around a virtual circumference, wherein the virtual circumference is centered below said extruding mechanism, said shutters passing the center of said virtual circumference to generate a chamfered constrictive gate about the center of said virtual circumference.

* * * * *